(12) United States Patent
Yamaguchi

(10) Patent No.: US 8,533,718 B2
(45) Date of Patent: Sep. 10, 2013

(54) BATCH JOB ASSIGNMENT APPARATUS, PROGRAM, AND METHOD THAT BALANCES PROCESSING ACROSS EXECUTION SERVERS BASED ON EXECUTION TIMES

(75) Inventor: Hiroyuki Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 12/966,883

(22) Filed: Dec. 13, 2010

(65) Prior Publication Data
US 2011/0145830 A1 Jun. 16, 2011

(30) Foreign Application Priority Data
Dec. 14, 2009 (JP) .................................. 2009-283042

(51) Int. Cl.
*G06F 9/455* (2006.01)
*G06F 9/46* (2006.01)

(52) U.S. Cl.
USPC ............................ 718/101; 718/104; 718/106

(58) Field of Classification Search
None
See application file for complete search history.

(56) References Cited

U.S. PATENT DOCUMENTS

| 6,889,243 B1* | 5/2005 | Hondou et al. ............... 718/100 |
| 2002/0004814 A1* | 1/2002 | Tanaka ........................ 709/201 |
| 2006/0026556 A1 | 2/2006 | Nishimura |
| 2007/0024898 A1* | 2/2007 | Uemura et al. .............. 358/1.15 |
| 2007/0220516 A1* | 9/2007 | Ishiguro et al. ............... 718/101 |
| 2007/0226743 A1* | 9/2007 | Takahashi ..................... 718/104 |
| 2007/0250835 A1* | 10/2007 | Kobayashi et al. ........... 718/102 |
| 2008/0016508 A1* | 1/2008 | Goto et al. .................... 718/102 |
| 2008/0115143 A1* | 5/2008 | Shimizu et al. ............... 718/105 |
| 2008/0209423 A1* | 8/2008 | Hirai ............................. 718/102 |
| 2008/0222620 A1* | 9/2008 | Little et al. .................... 717/149 |

FOREIGN PATENT DOCUMENTS

| JP | 54-118744 A | 9/1979 |
| JP | 2006-40084 A | 2/2006 |

* cited by examiner

*Primary Examiner* — Jennifer To
*Assistant Examiner* — Bradley Teets
(74) *Attorney, Agent, or Firm* — Fujitsu Patent Center

(57) ABSTRACT

A job assignment apparatus includes: a correlation calculation unit to calculate a correlation between an execution time used for processing a program that depends on a computer resource operating at the start of an execution request job and an execution time used for processing a predetermined amount of data in the execution request job which operates immediately after completion of an operation of the program; a resource identification unit to identify the computer resource on which the execution request job depends on the basis of the correlation calculated by the correlation calculation unit; and a job assignment unit to assign the execution request job to one of execution servers connected to the job assignment apparatus so as to exclude simultaneous execution of a job that depends on the same computer resource as the computer resource identified by the resource identification unit and the execution request job.

8 Claims, 12 Drawing Sheets

FIG. 3

| JOB NAME | RELATIONSHIP BETWEEN EXECUTION TIME AND AMOUNT OF DATA | ACTUAL MEASURED VALUE OF EXECUTION TIME PER PREDETERMINED AMOUNT OF DATA (SECOND) |
|---|---|---|
| J001 | $t = 2d \times T$ | 3 |
| J002 | $t = d \times T$ | 5 |
| J003 | $t = d \times T$ | 2 |
| ⋮ | ⋮ | ⋮ |
| J659 | $t = 3d \times T$ | 1 |
| J700 | $t = 2d \times T$ | 1 |

FIG. 4

| JOB NAME 32a | AMOUNT OF DATA (GB) [d] 32d | EXECUTION TIME (SECOND) [t] 32t | |
|---|---|---|---|
| J001 | 1 | 2 | |
| J001 | 1 | ③ | UNIT PROCESSING TIME [T] = 3 |
| J001 | 1 | 4 | |
| J001 | 2 | ⑫ | |
| J001 | 2 | 13 | t=2d×T  ~32b1 |
| J001 | 2 | 11 | |
| ⋮ | ⋮ | ⋮ | |
| J002 | 1 | 6 | |
| J002 | 1 | 4 | |
| J002 | 1 | ⑤ | UNIT PROCESSING TIME [T] = 5 |
| J002 | 2 | 9 | |
| J002 | 2 | 11 | t=d×T  ~32b2 |
| J002 | 2 | ⑩ | |
| ⋮ | ⋮ | ⋮ | |

FIG. 5

| JOB NAME 33a | THE NUMBER OF EXECUTION TIMES 33b | EXECUTION TIME OF THE JOB PER PREDETERMINED AMOUNT OF DATA (SECOND) 33c | EXECUTION TIME OF PROCESSING THAT DEPENDS ON RESOURCE A (SECOND) 33d | EXECUTION TIME OF PROCESSING THAT DEPENDS ON RESOURCE B (SECOND) 33e | EXECUTION TIME OF PROCESSING THAT DEPENDS ON RESOURCE C (SECOND) 33f |
|---|---|---|---|---|---|
| J001 | 1 | 6 | 0.021 | 0.011 | 0.021 |
| J001 | 2 | 3.2 | 0.012 | 0.082 | 0.022 |
| J001 | 3 | 6 | 0.023 | 0.013 | 0.023 |
| ⋮ | ⋮ | ⋮ | ⋮ | ⋮ | ⋮ |
| J001 | 99 | 8.5 | 0.03 | 0.01 | 0.023 |
| J001 | 100 | 5.8 | 0.018 | 0.098 | 0.028 |

| JOB NAME | CORRELATION WITH RESOURCE A | CORRELATION WITH RESOURCE B | CORRELATION WITH RESOURCE C |
|---|---|---|---|
| J001 | S | N | N |
| J002 | W | S | N |
| J003 | N | S | W |
| ⋮ | ⋮ | ⋮ | ⋮ |
| J659 | M | N | S |
| J700 | W | W | N |

FIG. 8

| JOB NAME | DEPENDENCE ON RESOURCE A | DEPENDENCE ON RESOURCE B | DEPENDENCE ON RESOURCE C |
|---|---|---|---|
| J001 | O | | |
| J002 | | O | |
| J003 | | O | |
| ⋮ | ⋮ | ⋮ | ⋮ |
| J659 | O | | O |
| J700 | | | |

FIG. 11

| JOB NAME | DEPENDENCE ON RESOURCE A | DEPENDENCE ON RESOURCE B | DEPENDENCE ON RESOURCE C | ... |
|---|---|---|---|---|
| EXCLUSION CHARACTER STRING | #0293484883 | #937846895 | #4759202948 | ... |
| J001 | O | | | ... |
| J002 | | O | | ... |
| J003 | | O | | ... |
| ⋮ | ⋮ | ⋮ | ⋮ | ... |
| J659 | O | | O | ... |
| J700 | | | | ... |

BATCH JOB ASSIGNMENT APPARATUS, PROGRAM, AND METHOD THAT BALANCES PROCESSING ACROSS EXECUTION SERVERS BASED ON EXECUTION TIMES

CROSS-REFERENCE TO RELATED APPLICATIONS

This application is based upon and claims the benefit of priority of the prior Japanese Patent Application No. 2009-283042, filed on Dec. 14, 2009, the entire contents of which are incorporated herein by reference.

FIELD

The present invention relates to a job assignment apparatus, a job assignment program, and a job assignment method.

BACKGROUND

In a computer system that performs batch jobs, when a plurality of batch jobs that depend on the same computer resource such as a CPU (Central Processing Unit) resource are performed, an exclusion control to exclude simultaneous execution of these batch jobs is performed. Unless the exclusion control is performed, the plurality of batch jobs try to use the same computer resource, so that a wait for assignment of the computer resource occurs. As a result, execution delays of the batch jobs occur. Further, a time out may occur by the execution delays of the batch jobs, it is considered that the batch jobs may end abnormally.

Therefore, in order to avoid such a case, an exclusion control is known in which an arbitrary character string to identify a computer resource on which a batch job depends is set for each batch job and a simultaneous execution of the batch jobs for which the same character string is set is prohibited (for example, Japanese Unexamined Patent Application Publication No. 54-118744 and Japanese Unexamined Patent Application Publication No. 2006-40084).

However, in the above conventional technique, unless a character string is set for each batch job, it is impossible to identify a computer resource on which each batch job depends. Therefore, when it is impossible to identify a computer resource on which each batch job depends, there is a problem that an exclusion control with respect to a computer resource on which each batch job depends cannot be properly performed.

SUMMARY

According to an aspect of the embodiment, a job assignment apparatus includes: a correlation calculation unit to calculate a correlation between an execution time used for processing a program that depends on a computer resource operating at the start of an execution request job and an execution time used for processing a predetermined amount of data in the execution request job which operates immediately after completion of an operation of the program; a resource identification unit to identify the computer resource on which the execution request job depends on the basis of the correlation calculated by the correlation calculation unit; and a job assignment unit to assign the execution request job to one of execution servers connected to the job assignment apparatus so as to exclude simultaneous execution of a job that depends on substantially the same computer resource as the computer resource identified by the resource identification unit and the execution request job.

The object and advantages of the embodiment will be realized and attained by at least the features, elements, and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram depicting an example of a data structure of an execution time management table;

FIG. 4 is a diagram for explaining a relationship between execution time and amount of data;

FIG. 5 is a diagram depicting an example of a data structure of an execution time information accumulation table;

FIG. 7 is a diagram depicting an example of a data structure of a correlation management table;

FIG. 8 is a diagram depicting an example of a data structure of an exclusion control management table;

FIG. 11 is a diagram depicting another example of the data structure of the exclusion control management table.

DESCRIPTION OF EMBODIMENTS

Hereinafter, embodiments of a job assignment apparatus, a job assignment program, and a job assignment method disclosed in the present invention will be described in detail with reference to the drawings. The present invention is not limited by the embodiments.

First Embodiment

Figure 1:
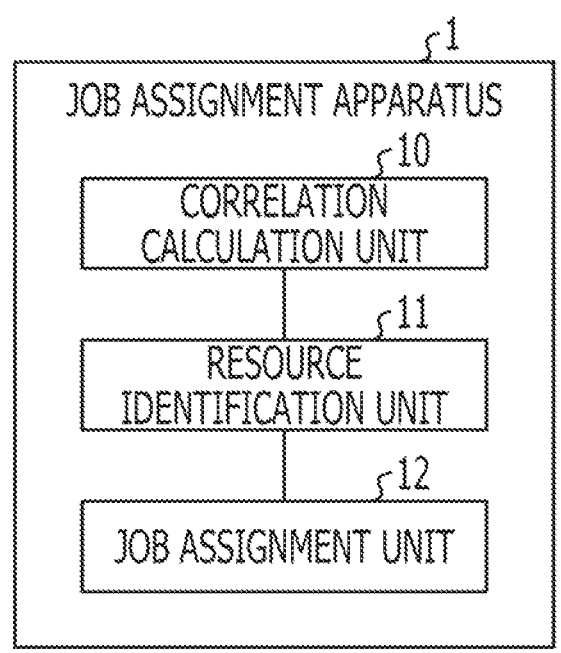
FIG. 1 is a functional block diagram depicting a configuration of a job assignment apparatus according to a first embodiment.

FIG. 1 is a functional block diagram depicting a configuration of a job assignment apparatus according to a first embodiment. A job assignment apparatus 1 includes a correlation calculation unit 10, a resource identification unit 11, and a job assignment unit 12.

The correlation calculation unit 10 calculates an execution time used for processing a program that depends on a computer resource operating at the start of an execution request job that is requested to be executed. Here, a job is a program that processes a certain amount of data, and for example, the job is a batch job. The computer resource includes, for example, a CPU resource, an I/O (Input/Output) resource, a memory resource, a network resource, and so forth. The correlation calculation unit 10 calculates an execution time used for processing a predetermined amount of data in the execution request job which operates immediately after the completion of operation of the program which operates at the start of the execution request job.

Further, the correlation calculation unit 10 calculates a correlation between the execution time used for processing the program that depends on the computer resource and the execution time used for processing a predetermined amount of data in the execution request job.

The resource identification unit 11 identifies a computer resource on which the execution request job depends on the basis of the correlation calculated by the correlation calculation unit 10. The job assignment unit 12 assigns the execution request job to one of execution servers connected to the job assignment apparatus so as to exclude simultaneous execution of the execution request job and a job that depends on the same execution server as the computer resource identified by the resource identification unit 11.

In this way, the job assignment apparatus 1 calculates the execution times of processing that depends on the computer resource and the execution request job which operate sequentially when the execution request job starts, so that the job assignment apparatus 1 may calculate a correlation between the two execution times in the same operation environment. Therefore, if the execution time used for processing that depends on the computer resource fluctuates in accordance with fluctuation of the execution time used for processing a predetermined amount of data in the execution request job, the job assignment apparatus 1 may calculate a correlation indicating that the correlation between the two execution times is strong. As a result, the job assignment apparatus 1 may easily determine whether or not the execution request job depends on the computer resource on the basis of the calculated correlation. The job assignment unit 1 assigns the execution request job to an execution server so as to exclude simultaneous execution of a job that depends on the same computer resource as that of the execution request job and the execution request job, so that the job assignment unit 1 may properly perform an exclusion control between the jobs that depend on the same computer resource.

Second Embodiment

Figure 2:
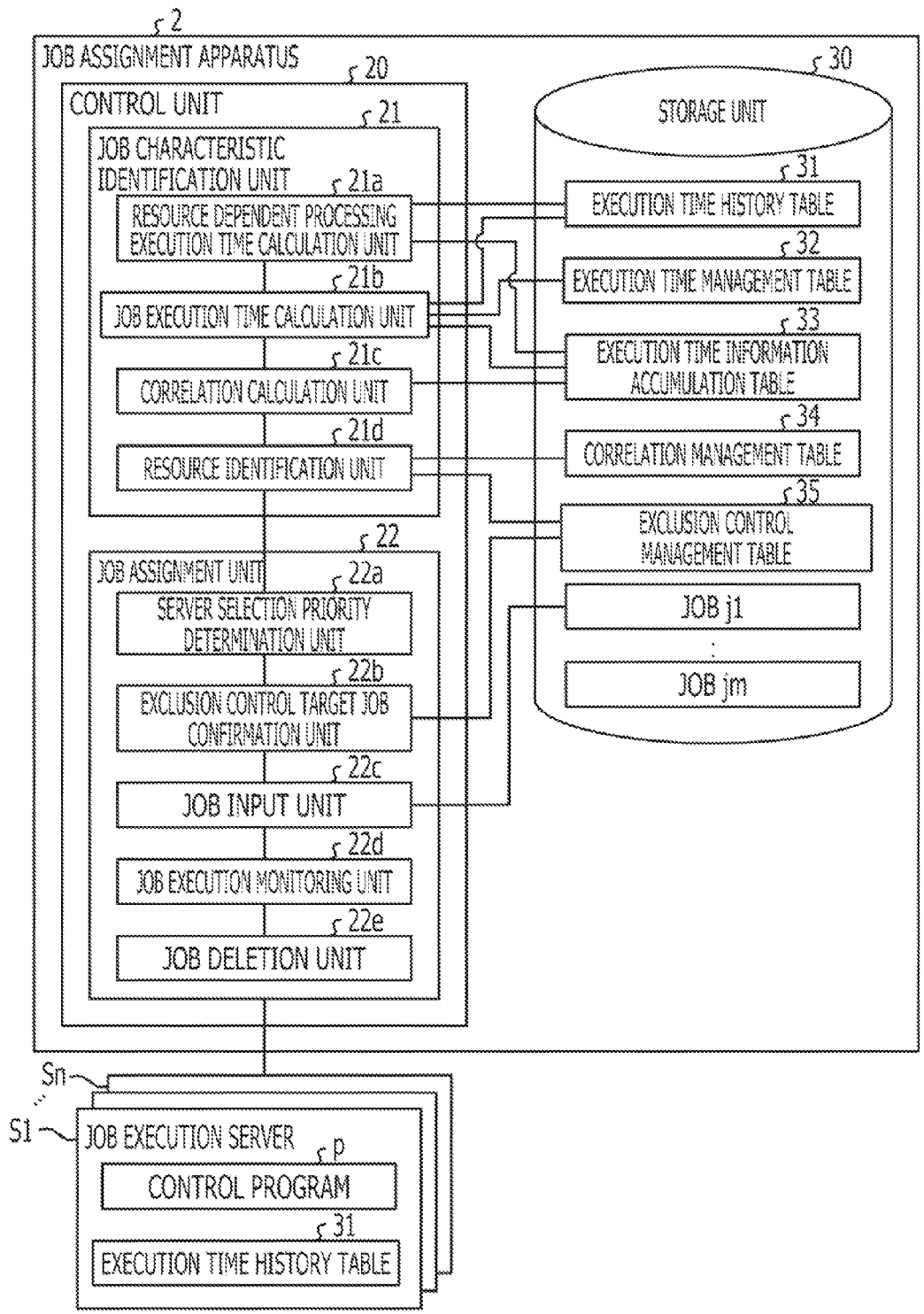
FIG. 2 is a functional block diagram depicting a configuration of a job assignment apparatus according to a second embodiment.

FIG. 2 is a functional block diagram depicting a configuration of a job assignment apparatus 2 according to a second embodiment. The job assignment apparatus 2 includes a control unit 20 and a storage unit 30.

The job assignment apparatus 2 is connected to job execution servers (hereinafter referred to as "execution server") S (S1 to Sn) (n>1) via a network. When the job assignment apparatus 2 sends a start request of a batch job to the execution server S, the execution server S executes a job execution control program (hereinafter referred to as "control program") p, and then starts the batch job.

Here, the control program p is a program that operates at the start of the batch job and starts the batch job, and also the control program p is a program in which processing that depends on the CPU resource, processing that depends on the I/O resource, and processing that depends on the memory resource are respectively made into programs and integrated. For example, the control program p performs I/O processing to make a file for managing an attribute of the batch job to be started and CPU processing to determine the processing sequence of the batch job at the start of the batch job.

The control unit 20 includes a job characteristic identification unit 21 for identifying a characteristic of the batch job requested to be started and a job assignment unit 22 for assigning the batch job whose characteristic is identified to an execution server S. The characteristic of the batch job indicates a computer resource on which the batch job depends. In other words, the job characteristic identification unit 21 identifies the computer resource on which the batch job requested to be started depends. While the computer resource includes, for example, the CPU resource, the I/O (Input/Output) resource, the memory resource, the network resource, and so forth, this embodiment describes the CPU resource, the I/O resource, and the memory resource as an example.

The job characteristic identification unit 21 includes a resource dependent processing execution time calculation unit 21a, a job execution time calculation unit 21b, a correlation calculation unit 21c, and a resource identification unit 21d. The job assignment unit 22 includes a server selection priority determination unit 22a, an exclusion control target job confirmation unit 22b, a job input unit 22c, a job execution monitoring unit 22d, and a job deletion unit 22e. The control unit 20 is, for example, an integrated circuit such as an ASIC (Application Specific Integrated Circuit) or an FPGA (Field Programmable Gate Array), or an electronic circuit such as a CPU (Central Processing Unit) or an MPU (Micro Processing Unit).

The storage unit 30 includes an execution time history table 31, an execution time management table 32, an execution time information accumulation table 33, a correlation management table 34, an exclusion control management table 35, and jobs j (j1 to jm) (m>1) representing a plurality of batch jobs. The storage unit 30 is, for example, a semiconductor memory chip such as a RAM (Random Access Memory) or a flash memory, or a storage apparatus such as a hard disk or an optical disk.

The resource dependent processing execution time calculation unit 21a calculates an execution time used for processing that depends on a computer resource in a program which operates at the start of the execution request job that is requested to be executed. Specifically, the resource dependent processing execution time calculation unit 21a calculates execution times used for each processing that depends on a computer resource different from each other in the control program p which operates at the start of the execution request job. For example, the resource dependent processing execution time calculation unit 21a calculates an execution time used for processing that depends on the CPU resource, an execution time used for processing that depends on the I/O resource, and an execution time used for processing that depends on the memory resource in the control program p which operates at the start of the execution request job.

More specifically, the resource dependent processing execution time calculation unit 21a calculates execution times used for each processing that depends on a computer resource different from each other in the control program p which operates at the start of the execution request job by using the execution time history table 31 created by the control program p. The execution time history table 31 stores processing time information by the control program p and the execution request job. Hereinafter, the calculation of the execution time using the execution time history table 31 will be described.

At the start of the execution request job, the control program p obtains a start time and an end time of the processing that depends on each resource by using a system time acquisition function (for example, timeGetSystemTime or timeGetTime). The control program p stores the start time and the end time of the processing that depends on each resource, the name of the execution request job, and the number of execution times of the execution request job in the execution time history table 31 in the execution server S.

Further, the execution request job obtains a start time and an end time of executed processing by using the system time acquisition function (for example, timeGetSystemTime or timeGetTime). The execution request job stores the start time and the end time of the executed processing, the name of the execution request job, the number of execution times, and the amount of processing data in the execution time history table 31 in the execution server S. The execution request job obtains the amount of processing data by using a file size acquisition function (for example, GetFileSize). The execution server S transmits the processing time information stored in the execution time history table 31 to the job assignment apparatus 2 regularly or irregularly.

By using the execution time history table 31, the resource dependent processing execution time calculation unit 21a calculates difference values by subtracting the start time from the end time of each processing that depends on the resources as the execution times of the processing that depends on each resource. The resource dependent processing execution time calculation unit 21 stores the calculated execution times of the processing that depends on each resource in the execution time information accumulation table 33 described later along with the name of the execution request job and the number of the execution times.

Return to FIG. 2. The job execution time calculation unit 21b calculates an execution time used for processing a predetermined amount of data in the execution request job which operates immediately after the completion of the operation of the control program p. While the predetermined amount of data is 1 gigabytes (GB), 2 GB, or the like, in the description of this embodiment, the predetermined amount of data is assumed to be 1 GB as an example.

Specifically, the job execution time calculation unit 21b calculates the total execution time used for processing the execution request job using the execution time history table 31. More specifically, the job execution time calculation unit 21b calculates a difference value by subtracting the start time from the end time of the processing executed by the execution request job as the "total execution time" of the execution request job using the execution time history table 31.

The job execution time calculation unit 21b calculates an execution time used for processing a predetermined amount of data in the execution request job by using the calculated "total execution time", the "amount of data" of the processing data, and the execution time management table 32 described below. Here, the "amount of data" of the processing data indicates the amount of data processed by the execution request job, and is stored in the execution time history table 31 described above.

Here, the execution time management table 32 will be described with reference to FIG. 3. FIG. 3 is a diagram depicting an example of a data structure of the execution time management table. The execution time management table 32 stores a job name 32a of batch job, a "relationship between the execution time and the amount of data" 32b, and an "actual measured value of the execution time per predetermined amount of data" 32c associated with each other for each plurality of jobs. The execution time management table 32 is created in advance before the job characteristic identification unit 21 performs job characteristic identification processing.

The "relationship between the execution time and the amount of data" 32b is a calculation formula indicating a relationship between the execution time used by the processing of the batch job and the amount of data of the data processed by the batch job. For example, the "relationship between the execution time and the amount of data" 32b of a job name 32a "J001" is represented by a calculation formula "t=2d×T". "d" indicates the amount of data (unit: GB) (hereinafter referred to as "processing amount of data") processed by the batch job. "T" indicates an execution time (unit: second) (hereinafter referred to as "unit processing time") when the batch job processes a predetermined amount of data (1 GB). "t" indicates an execution time (unit: second) (hereinafter referred to as "processing execution time") when the batch job processes the amount of data "d". Thus, the processing execution time "t" of the job name "J001" is obtained by the formula "2d×T" from the processing amount of data "d" and the unit processing time "T". The "actual measured value of the execution time per predetermined amount of data" 32c is an actual measured value of the execution time when the batch job processed a predetermined amount of data, and indicates the unit processing time "T".

Here, a relational expression indicating the "relationship between the execution time and the amount of data" 32b included in the execution time management table 32 will be described with reference to FIG. 4. FIG. 4 is a diagram for explaining the relationship between the execution time and the amount of data. The relational expression indicating the "relationship between the execution time and the amount of data" 32b is obtained by an execution time 32t when a batch job indicated by the job name 32a processes data of the amount of data indicated by an amount of data 32d.

First, before the job characteristic identification unit 21 performs the job characteristic identification processing, a preliminary processing unit not depicted in the figures executes batch jobs by using a predetermined execution server S while changing the amount of data 32d to be processed for a plurality of times, and stores execution times 32t corresponding to the amounts of data 32d in a log. The "relationship between the execution time and the amount of data" 32b in the execution time management table 32 is desired information used when calculating correlation after the job execution time calculation unit 21b. Therefore, the execution server S which obtains information from which the "relationship between the execution time and the amount of data" 32b is derived is desired to be processed in a state in which there is no pressure on the computer resource, in other words, in a state in which there is no job executing or no job waiting for execution at all.

The preliminary processing unit calculates an average value of the execution times 32t with respect to the amounts of data 32d of the processed data. The preliminary processing unit calculates an average value of the execution times when the amount of data 32d is 1 GB as the unit processing time "T". Further, the preliminary processing unit obtains a relational expression indicating the "relationship between the execution time and the amount of data" 32b from the execution time 32t for the amount of data 32d and the unit processing time "T".

For example, in a batch job of the job name 32a "J001", the average value of the execution times 32t for processing the amount of data 32d of "1" GB is "3", so that "3" is the unit processing time "T". Also, in the batch job of the job name 32a "J001", the average value of the execution times 32t for processing the amount of data 32d of "2" GB is "12". Therefore, from the average value "12" of the execution times 32t for processing the amount of data 32d of "2" GB and the unit processing time "T" (t=3), the execution time "t" for the amount of data "d" is obtained as "t=2d×T" 32b1. This expression is a relational expression indicating the "relationship between the execution time and the amount of data" 32b of the batch job of the job name 32a "J001". In substantially the same manner, the relational expression indicating the "relationship between the execution time and the amount of data" 32b of the batch job of the job name 32a "J002" is obtained as "t=d×T" 32b2.

The job execution time calculation unit 21b calculates an execution time used for processing a predetermined amount of data by using the "relationship between the execution time and the amount of data" 32b. Specifically, the job execution time calculation unit 21b extracts a calculation formula indicating the "relationship between the execution time and the amount of data" 32b of the execution request job from the execution time management table 32. Then, the job execution time calculation unit 21b calculates the execution time used for processing a predetermined amount of data by substituting the "total execution time" of the execution request job and the "amount of data" of the processing data into the extracted calculation formula.

For example, a case in which the calculation formula indicating the "relationship between the execution time and the amount of data" 32b of the execution request job is "t=2d×T" will be described. From the calculation formula "t=2d×T", the unit processing time "T" is represented by "T=t/2d". The job execution time calculation unit 21b substitutes the "total execution time" of the execution request job for the processing execution time "t" and substitutes the "amount of data" of the processing data for the processing amount of data "d" in the "T=t/2d", and calculates the unit processing time "T".

The job execution time calculation unit 21b stores the calculated unit processing time "T" in the execution time information accumulation table 33 along with the name of the execution request job and the number of execution times indicating how many times the execution request job was executed.

Here, the execution time information accumulation table 33 will be described with reference to FIG. 5. FIG. 5 is a diagram depicting an example of a data structure of the execution time information accumulation table 33. The execution time information accumulation table 33 stores a job name 33a, the number of execution times 33b, an "execution time of the job per predetermined amount of data" 33c, and execution times 33d to 33f of processing that depends on resources A, B, and C respectively which are associated with each other for each plurality of jobs. For example, the resource A is the CPU resource, the resource B is the I/O resource, and the resource C is the memory resource.

The job name 33a is a name of the batch job. The name of the execution request job is stored in the job name 33a. The number of execution times 33b is the number for which the batch job indicated by the job name 33a was executed and is a serial number started from 1. The "execution time of the job per predetermined amount of data" 33c is a processing time when the batch job processed a predetermined amount of data (1 GB), and is the unit processing time "T" calculated by the job execution time calculation unit 21b.

The "execution time of the processing that depends on the resource A" 33d is a processing time used for the processing that depends on the resource A in the control program p which operates at the start of the batch job, and also is the execution time calculated by the resource dependent processing execution time calculation unit 21a. The "execution time of the processing that depends on the resource B" 33e is a processing time used for the processing that depends on the resource B in the control program p which operates at the start of the batch job, and also is the execution time calculated by the resource dependent processing execution time calculation unit 21a. The "execution time of the processing that depends on the resource C" 33f is a processing time used for the processing that depends on the resource C in the control program p which operates at the start of the batch job, and also is the execution time calculated by the resource dependent processing execution time calculation unit 21a.

For example, in a field indicated by a symbol r1, at the second execution of the job of the job name 33a "J001", "3.2" seconds calculated as the execution time per predetermined amount of data is stored, and "0.012" seconds calculated as the execution time of the processing that depends on the resource A" is stored. Also, "0.082" seconds calculated as the execution time of the processing that depends on the resource B is stored, and "0.022" seconds calculated as the execution time of the processing that depends on the resource C is stored.

Figure 6:
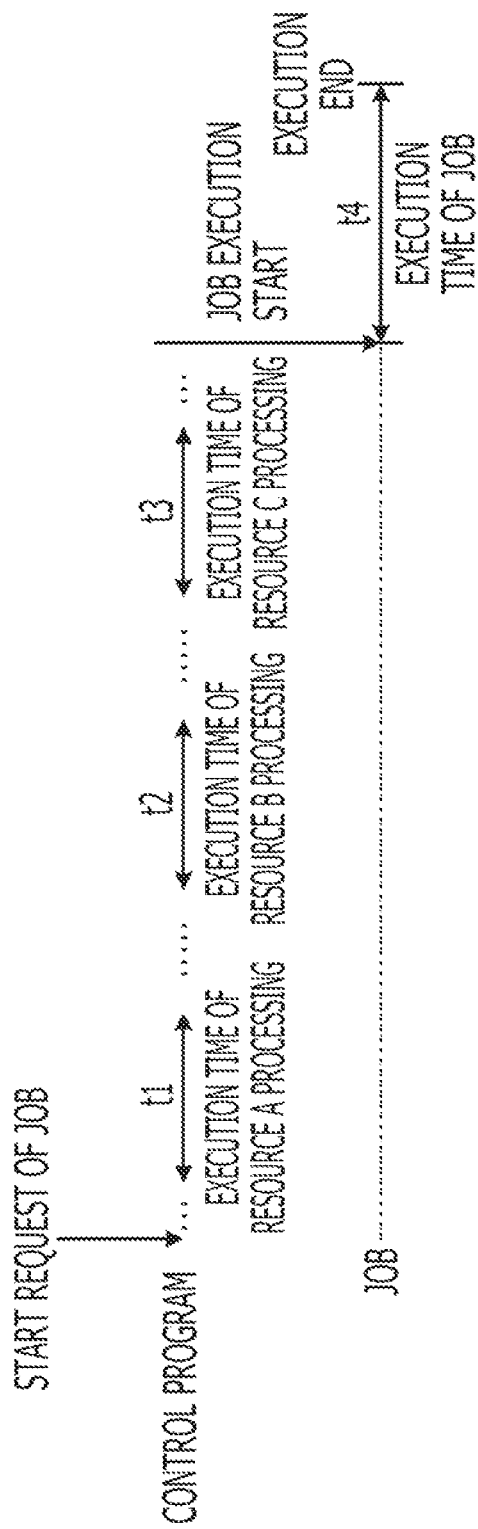
FIG. 6 is an illustration depicting a relationship between execution times of control program and job.

Here, the execution time used for the processing that depends on the computer resource in the control program p and the execution time of the batch job will be described with reference to FIG. 6. FIG. 6 is an illustration depicting a relationship between the execution times of the control program p and the job. For example, when a start request of the execution request job that is requested to be executed is sent to the execution server S, the control program p operates in the execution server S. In the execution server S, the processing that depends on the resource A in the control program p is executed during the execution time "t1", and then, the processing that depends on the resource B and the processing that depends on the resource C are executed during the execution times "t2" and "t3" respectively. Thereafter, in the execution server S, the execution request job started by the control program p starts execution and ends execution during the execution time "t4".

The execution times "t1", "t2", and "t3" are stored respectively in the "execution time of the processing that depends on the resource A" 33d, the "execution time of the processing that depends on the resource B" 33e, and the "execution time of the processing that depends on the resource C" 33f in the execution time information accumulation table 33. A value obtained on the basis of the execution time "t4" by using the "relationship between the execution time and the amount of data" 32b in the execution time management table 32 is stored in the "execution time of the job per predetermined amount of data" 33c in the execution time information accumulation table 33.

Return to FIG. 2. the correlation calculation unit 21c calculates a correlation between the execution time used for the processing that depends on the computer resource in the control program p that operates at the start of the execution request job and the execution time used for processing a predetermined amount of data in the execution request job. The execution time used for the processing that depends on the computer resource is referred to as "resource execution time" and the execution time used for processing a predetermined amount of data is referred to as "unit processing time".

Specifically, when information related to the execution request job for the predetermined number of execution times is stored in the execution time information accumulation table 33, the correlation calculation unit 21c calculates an average and a standard deviation of the "resource execution times" of the control program p for the predetermined number of execution times. The correlation calculation unit 21c also calculates an average and a standard deviation of the "unit processing times" of the execution request job for the predetermined number of execution times. The correlation calculation unit 21c calculates a deviation product of the "resource execution times" and the "unit processing times" for each predetermined number of execution times by using the average of the "resource execution times" and the average of the "unit processing times", and calculates an average of the deviation products from the deviation products calculated for each predetermined number of execution times. The correlation calculation unit 21c calculates a correlation coefficient by dividing the calculated average of the deviation products by a product of the standard deviation of the "resource execution times" and the standard deviation of the "unit processing times". The predetermined number of execution times is, for example, 100 times. However it is not limited to this.

For example, the correlation calculation unit 21c calculates correlation coefficients between the "unit processing time" of the execution request job and each "resource execution time" of the processing that depends on the CPU resource, the processing that depends on the I/O resource, and the processing that depends on the memory resource in the control program p.

The resource identification unit 21d identifies a computer resource on which the execution request job depends on the basis of the correlation calculated by the correlation calculation unit 21c. Specifically, the resource identification unit 21d determines the strength of correlation between the execution request job and the processing that depends on the computer resource in the control program p from the correlation coefficient thereof, and classifies the execution request job with respect to the processing that depends on the computer resource on the basis of the determined strength of the correlation. Then, the resource identification unit 21d stores the classified execution request job and a classification result (identification code) in the correlation management table 34.

For example, when the correlation coefficient is ±0.7 to ±1.0, it is assumed that there is a strong correlation, so that the identification code is set to "S" (Strong). When the correlation coefficient is ±0.4 to ±0.7, it is assumed that there is a medium correlation, so that the identification code is set to "M" (Medium). When the correlation coefficient is ±0.2 to ±0.4, it is assumed that there is a weak correlation, so that the identification code is set to "W" (Weak). When the correlation coefficient is ±0.0 to ±0.2, it is assumed that there is almost no correlation, so that the identification code is set to "N" (None). If the correlation coefficient between the CPU resource of the control program p and the execution request job is "+0.8", the resource identification unit 21d determines the strength of the correlation to be "S" from the correlation coefficient, and classifies the execution request job into "S" with respect to the CPU resource.

The resource identification unit 21d identifies a computer resource on which the execution request job depends on the basis of the classification result (identification code). For example, the resource identification unit 21d identifies a resource whose identification code is "S" or "M" with respect to the execution request job as the computer resource on which the execution request job depends.

Here, the correlation management table 34 will be described with reference to FIG. 7. FIG. 7 is a diagram depicting an example of a data structure of the correlation management table 34. The correlation management table 34 stores a job name 34a of batch job, a correlation 34b with the resource A, a correlation 34c with the resource B, and a correlation 34d with the resource C associated with each other for each plurality of jobs. For example, the resource A is the CPU resource, the resource B is the I/O resource, and the resource C is the memory resource.

The "correlation with the resource A" 34b indicates the strength of the correlation between the batch job indicated by the job name 34a and the resource A, and is represented by the identification code based on the correlation coefficient described above. The "correlation with the resource B" 34c indicates the strength of the correlation between the batch job indicated by the job name 34a and the resource B, and is represented by the identification code based on the correlation coefficient in substantially the same manner as the "correlation with the resource A" 34b. The "correlation with the resource C" 34d indicates the strength of the correlation between the batch job indicated by the job name 34a and the resource C, and is represented by the identification code based on the correlation coefficient in substantially the same manner as the "correlation with the resource A" 34b.

For example, the correlation with the resource A 34b of the batch job of the job name 34a "J001" is "S", so that the batch job has a strong correlation with the resource A. On the other hand, the correlation with the resource B 34c and the correlation with the resource C 34d of the batch job of the job name 34a "J001" is "N", so that the batch job has almost no correlation with the resources B and C. As a result, the computer resource on which the job of the job name 34a "J001" depends is the resource A.

The resource identification unit 21d determines that the execution request job whose computer resource on which the execution request job depends is identified is a job to be a target of exclusion control. Specifically, when the resource identification unit 21d determines that there is a computer resource having a correlation with the execution request job on the basis of the correlation management table 34, the resource identification unit 21d determines that the execution request job is a job to be a target of exclusion control. For example, the computer resource having a correlation with the execution request job is a computer resource whose identification code with respect to the execution request job stored in the correlation management table 34 is "S" or "M".

The resource identification unit 21 associates the execution request job to be a target of exclusion control with the computer resource on which the execution request job depends and stores the execution request job in the exclusion control management table 35, and resource identification unit 21 outputs a start request of the execution request job to the job assignment unit 22. Here, the exclusion control management table 35 will be described with reference to FIG. 8. FIG. 8 is a diagram depicting an example of a data structure of the exclusion control management table 35. The exclusion control management table 35 stores a job name 35a of batch job, a dependence 35b on the resource A, a dependence 35c on the resource B, and a dependence 35d on the resource C associated with each other for each plurality of jobs.

The "dependence on the resource A" 35b indicates a dependence on the resource A of the batch job indicated by the job name 35a, and "O" indicates that there is a dependence. Specifically, when the dependence on the resource A 35b is "O", the batch job indicated by the job name 35a is controlled exclusively from jobs which depend on the same computer resource as the resource A. For example, the batch job of the job name 35a "J001" depends on the resource A, so that the batch job of the job name 35a "J001" is controlled exclusively from the job "J659" which depends on the same computer resource as the resource A.

The "dependence on the resource B" 35c indicates a dependence on the resource B of the batch job indicated by the job name 35a, and "O" indicates that there is a dependence. The "dependence on the resource C" 35d indicates a dependence on the resource C of the batch job indicated by the job name 35a, and "O" indicates that there is a dependence.

Return to FIG. 2. The server selection priority determination unit 22a determines a selection priority of the execution servers S to execute the execution request job on the basis of a multiplicity of the execution servers S. The multiplicity of the execution server S is a rate calculated by dividing the number of jobs that are currently being executed in the execution server S by the maximum number of jobs that may be executed. Specifically, the server selection priority determination unit 22a determines the selection priority of the execution servers S in ascending order from the execution server S whose multiplicity is the lowest among the execution servers S connected to the job assignment apparatus. In other words, the lower the multiplicity of the execution server S is, the higher the selection priority of the execution server S is.

The exclusion control target job confirmation unit 22b searches for an execution server S in which no job is executed which depends on the same computer resource as the computer resource on which the execution request job depends among the execution servers S selected in accordance with the selection priority.

Specifically, the exclusion control target job confirmation unit 22b sequentially selects the execution servers S from the execution server S of highest selection priority which is determined by the server selection priority determination unit 22a. The exclusion control target job confirmation unit 22b extracts the computer resource on which the execution request job depends from the exclusion control management table 35. The exclusion control target job confirmation unit 22b determines whether or not there is a batch job which depends on the same computer resource as the extracted computer resource and is currently being executed or waits to be executed in the selected execution server S.

If there is a batch job which depends on the same computer resource as the extracted computer resource and is currently being executed or waits to be executed, the exclusion control target job confirmation unit 22b selects the execution server S of the next selection priority. On the other hand, if there is no batch job which depends on the same computer resource as the extracted computer resource and is currently being executed or waits to be executed, the exclusion control target job confirmation unit 22b ends the search of the execution server S.

When an execution server S in which no job is executed which depends on the same computer resource as the computer resource on which the execution request job depends is found, the job input unit 22c inputs the execution request job in queues of all the execution servers S that have been searched for. Then, the job input unit 22c sets the execution request jobs in all the execution servers S in which the execution request job is inputted in an execution suspended state.

For example, it is assumed that, in the execution server S which has the third highest selection priority, no batch job is executed which depends on the same computer resource as the computer resource on which the execution request job depends. In this case, the job input unit 22c inputs the execution request job in the execution servers S having the highest to the third highest selection priorities.

The job execution monitoring unit 22d monitors all the execution servers S in which the execution request job is inputted, and detects an execution server S in which batch job which depends on the same computer resource as that on which the execution request job depends disappears completely first among all the execution servers S. Then, the job execution monitoring unit 22d transfers the state of the execution request job in the detected execution server S from the execution suspended state to an execution enable state (execution waiting state).

The job deletion unit 22e deletes the execution request job from the execution servers S other than the execution server S in which the execution request job is set in the execution enable state (execution waiting state) first by the job execution monitoring unit 22d. As a result, thereafter, the execution request job is started by the control program p in the execution server S in which the execution request job is set in the execution enable state (execution waiting state) first, and the state is transferred from the execution enable state (execution waiting state) to an executing state.

For example, it is assumed that the job input unit 22c inputs the execution request job in the execution servers S having the highest to the third highest selection priorities. In this case, even if a job which depends on the same computer resource as that on which the execution request job depends is executed in the execution servers S having a higher selection priority, when the execution server S having the third highest selection priority becomes an execution enable state first, the execution request job is executed in the execution server S having the third selection priority. On the other hand, even if a job which depends on the same computer resource as that on which the execution request job depends is being executed in an execution server S having a higher selection priority, when the job being executed is completed early and the execution server S becomes an execution enable state first, the execution request job is executed in the execution server S having the first or the second selection priority.

Figure 9:
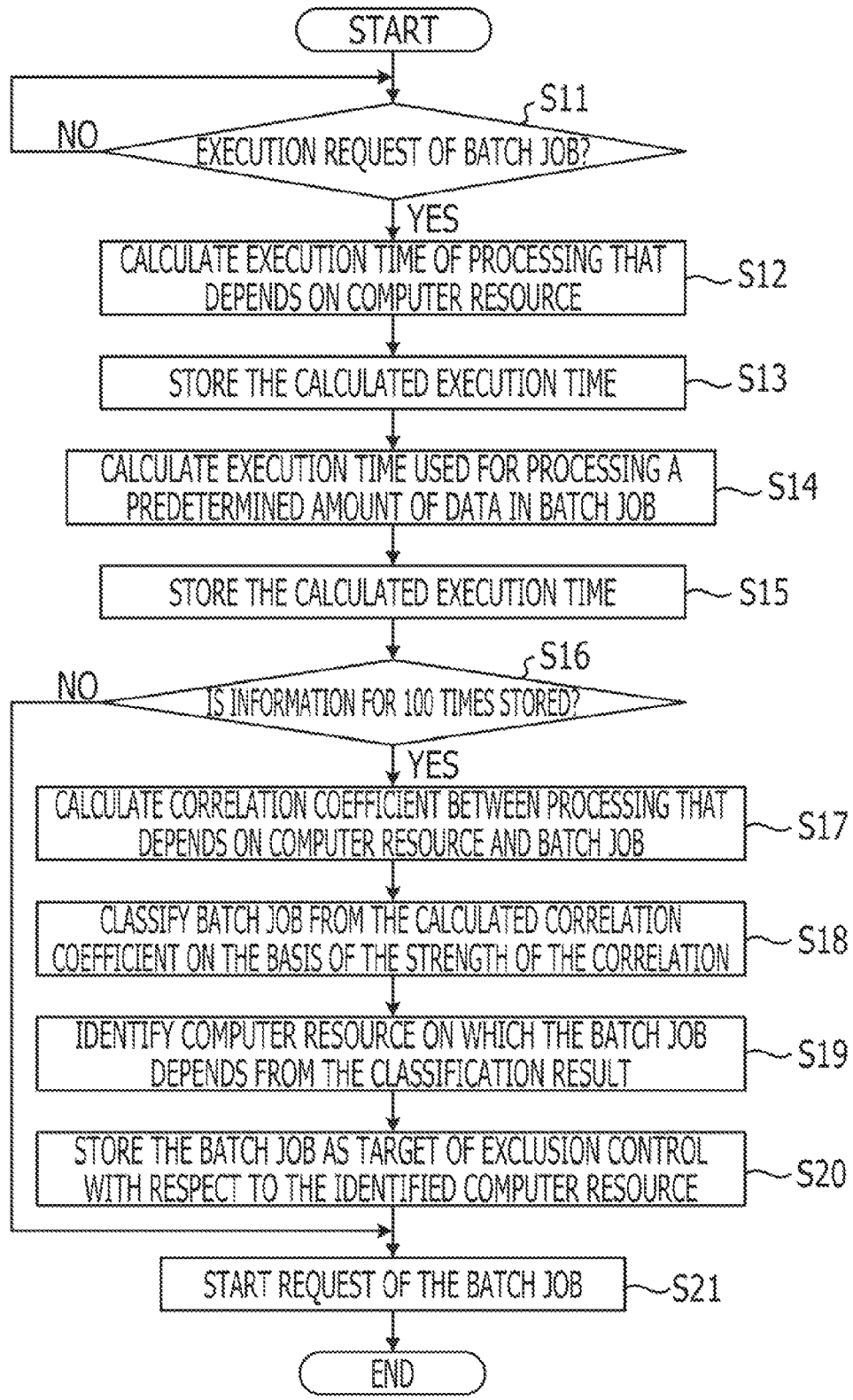
FIG. 9 is a flowchart depicting a processing operation of a job assignment apparatus related to job characteristic identification processing.

Next, a processing procedure of job characteristic identification processing according to a second embodiment will be described with reference to FIG. 9. FIG. 9 is a flowchart depicting a processing operation of the job assignment apparatus related to the job characteristic identification processing. It is assumed that the execution time history table 31 is created in advance by the control program p that operates at the start of the batch job (execution request job) and the execution request job.

First, the resource dependent processing execution time calculation unit 21a determines whether or not an execution request of the batch job is issued (step S11). If the execution request of the batch job is not issued (step S11: No), the resource dependent processing execution time calculation unit 21a waits for the execution request of the batch job.

On the other hand, if the execution request of the batch job is issued (step S11: Yes), the resource dependent processing execution time calculation unit 21a calculates an execution time used for the processing that depends on the computer resource in the control program p that operates at the start of the batch job (execution request job) (step S12). Specifically, the resource dependent processing execution time calculation unit 21a calculates execution times used for each processing that depends on a computer resource different from each other in the control program p by using the execution time history table 31. For example, the resource dependent processing execution time calculation unit 21a calculates the execution times of the processing that depends on the CPU resource, the processing that depends on the I/O resource, and the processing that depends on the memory resource in the control program p.

Then, the resource dependent processing execution time calculation unit 21 stores the calculated execution times of the processing that depends on each computer resource in the execution time information accumulation table 33 along with the name of the execution request job and the number of the execution times (step S13).

The job execution time calculation unit 21b calculates an execution time (unit processing time) used for processing a predetermined amount of data in the execution request job which operates immediately after the completion of the operation of the control program p (step S14). Specifically, the job execution time calculation unit 21b calculates the total execution time used for processing the execution request job using the execution time history table 31. Then, the job execution time calculation unit 21b calculates an execution time (unit processing time) per predetermined amount of data by using the calculated total execution time used for processing the execution request job, the amount of data of the processing data, and the execution time management table 32.

Then, the job execution time calculation unit 21b stores the calculated execution time (unit processing time) per predetermined amount of data in the execution time information accumulation table 33 along with the name of the execution request job and the number of the execution times (step S15).

Next, the correlation calculation unit 21c determines whether or not information related to the execution request job for a predetermined number of execution times is stored in the execution time information accumulation table 33 (step S16). The predetermined number of execution times is, for example, 100 times. However it is not limited to this.

If the information related to the execution request job for a predetermined number of execution times is not stored (step S16: No), the correlation calculation unit 21c determines that the amount of information is too small to identify the computer resource on which the execution request job depends, and proceeds to step S21.

On the other hand, if the information related to the execution request job for a predetermined number of execution times is stored (step S16: Yes), the correlation calculation unit 21c performs the following processing. The correlation calculation unit 21c calculates a correlation between the execution time used for the processing that depends on the computer resource in the control program p and the execution time (unit processing time) used for processing a predetermined amount of data in the execution request job (step S17). For example, the correlation calculation unit 21c calculates correlation coefficients between the "unit processing time" of the execution request job and each resource execution time of the processing that depends on the CPU resource, the processing that depends on the I/O resource, and the processing that depends on the memory resource in the control program p.

The resource identification unit 21d determines the strength of the correlation from the correlation coefficients calculated by the correlation calculation unit 21c, and classifies the execution request job with respect to the processing that depends on the computer resource on the basis of the determined strength of the correlation (step S18).

The resource identification unit 21d identifies a computer resource on which the execution request job depends on the basis of the classification result (identification code) (step S19).

Further, the resource identification unit 21 determines that the execution request job whose computer resource on which the execution request job depends is identified is a target of exclusion control, and the resource identification unit 21 associates the determined execution request job with the computer resource on which the execution request job depends and stores the execution request job in the exclusion control management table 35 (step S20).

Then, the resource identification unit 21d outputs a start request of the execution request job to the job assignment unit 22 (step S21).

In the job characteristic identification processing described above, after the execution time calculation processing performed by the resource dependent processing execution time calculation unit 21a (step S12 to S13), the execution time calculation processing performed by the job execution time calculation unit 21b (step S14 to S15) is performed. However, it is possible to reverse the processing order of the execution time calculation processing performed by the resource dependent processing execution time calculation unit 21a and the execution time calculation processing performed by the job execution time calculation unit 21b, or perform the processing in parallel.

Figure 10:
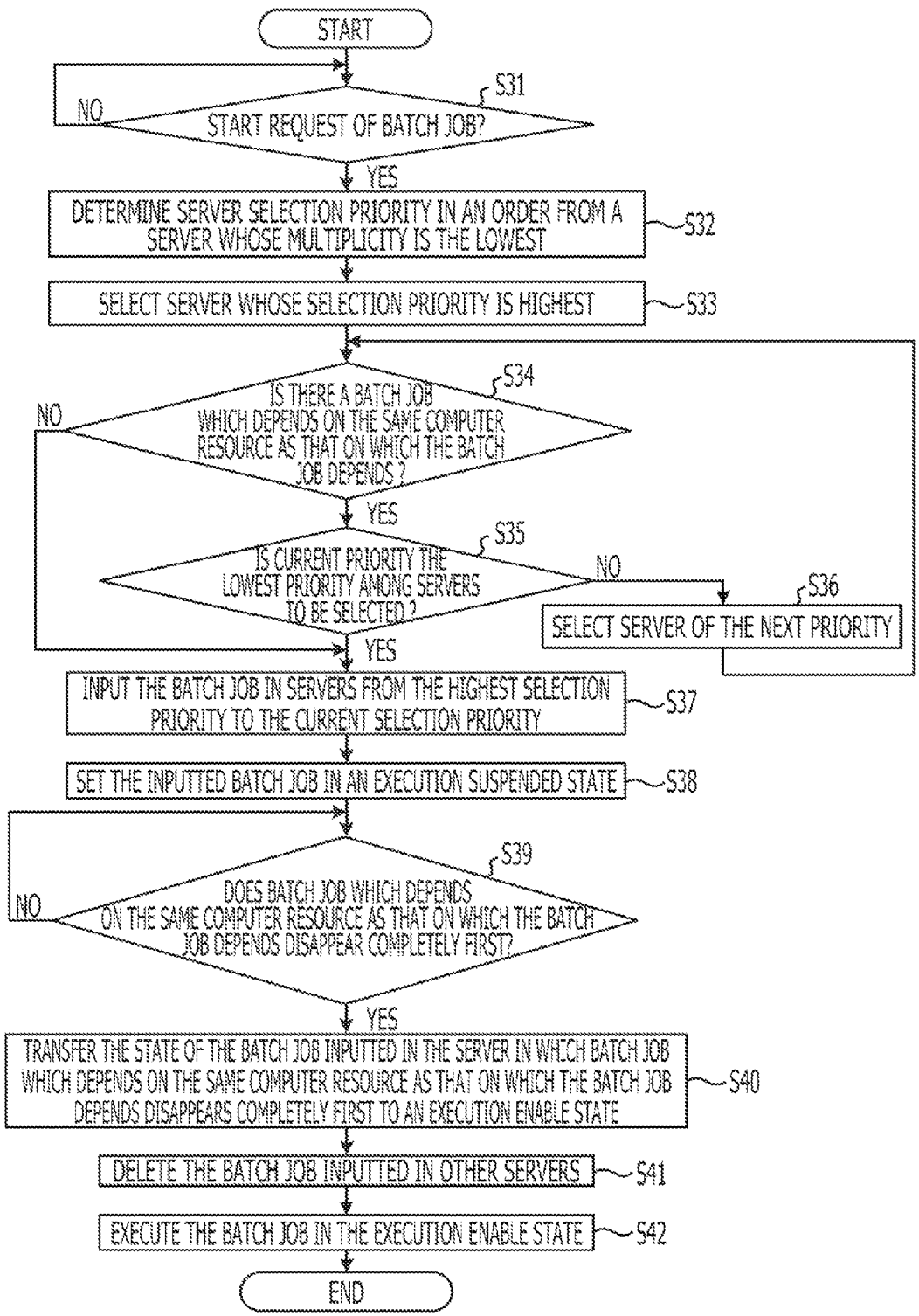
FIG. 10 is a flowchart depicting a processing operation of the job assignment apparatus related to job assignment processing.

Next, a processing procedure of job assignment processing according to the second embodiment will be described with reference to FIG. 10. FIG. 10 is a flowchart depicting a processing operation of the job assignment apparatus related to the job assignment processing.

First, the server selection priority determination unit 22a determines whether or not a start request of the batch job is issued (step S31). If the start request of the batch job is not issued (step S31: No), the server selection priority determination unit 22a waits for the start request of the batch job.

On the other hand, if the start request of the batch job is issued (step S31: Yes), the server selection priority determination unit 22a determines the selection priority of the execution servers S in ascending order from the execution server S whose multiplicity is the lowest among the execution servers S connected to the job assignment apparatus (step S32). In other words, the lower the multiplicity of the execution server S is, the higher the selection priority of the execution server S is.

The exclusion control target job confirmation unit 22b selects an execution server S whose selection priority is the highest and the first (step S33). The exclusion control target job confirmation unit 22b extracts the computer resource on which the execution request job depends from the exclusion control management table 35.

The exclusion control target job confirmation unit 22b determines whether or not there is a batch job which depends on the same computer resource as the extracted computer resource and is currently being executed or waits to be executed in the selected execution server S (step S34).

If there is a batch job which depends on the same computer resource as the extracted computer resource and is currently being executed or waits to be executed (step S34: Yes), the exclusion control target job confirmation unit 22b determines whether or not the current priority is the last priority that indicates the lowest priority (step S35). If the current priority is not the last priority that indicates the lowest priority (step S35: No), the exclusion control target job confirmation unit 22b selects the execution server S of the next priority (step S36) and proceeds to step S34.

On the other hand, if there is no batch job which depends on the same computer resource as the computer resource on which the execution request job depends and is currently being executed or waits to be executed (step S34: No), the exclusion control target job confirmation unit 22b performs the processing described below. The job input unit 22c inputs the execution request job in queues of all the execution servers S from the execution server S of the first selection priority to the execution server S of the current selection priority (step S37), and sets the execution request jobs in an execution suspended state (step S38). If the current priority is the last priority that indicates the lowest priority (step S35: Yes), the exclusion control target job confirmation unit 22b also performs the same processing on all the execution servers S from the execution server S of the first selection priority to the execution server S of the last selection priority.

Next, the job execution monitoring unit 22d monitors all the execution servers S in which the execution request job is inputted, and detects an execution server S in which batch job which depends on the same computer resource as that on which the execution request job depends disappears completely first among all the execution servers S (step S39). If there is no execution server S in which batch job which depends on the same computer resource as that on which the execution request job depends disappears completely first among all the execution servers S in which the execution request job is inputted (step S39: No), the job execution monitoring unit 22d waits for such an execution server S.

On the other hand, if there is an execution server S in which batch job which depends on the same computer resource as that on which the execution request job depends disappears completely first among all the execution servers S in which the execution request job is inputted (step S39: Yes), the job execution monitoring unit 22d performs the following processing. The job execution monitoring unit 22d transfers the state of the execution request job in the execution server S in which batch job which depends on the same computer resource as that on which the execution request job depends disappears completely from the execution suspended state to the execution enable state (step S40).

The job deletion unit 22e deletes the execution request job from the execution servers S other than the execution server S in which the execution request job is set in the execution enable state (execution waiting state) first by the job execution monitoring unit 22d (step S41).

Thereafter, the execution request job is started by the control program p in the execution server S in which the execution request job is set in the execution enable state (execution waiting state) first, and the state is transferred from the execution enable state (execution waiting state) to an executing state (step S42).

According to the above-described second embodiment, the job assignment apparatus 2 calculates the execution time used for the processing that depends on the computer resource in the control program p that operates at the start of the execution request job and the execution time used for processing a predetermined amount of data in the execution request job which operates immediately after the completion of the operation of the control program p. The job assignment apparatus 2 also calculates a correlation between the calculated execution time used for the processing that depends on the computer resource and the calculated execution time used for processing a predetermined amount of data in the execution request job. Then, the job assignment apparatus 2 identifies a computer resource on which the execution request job depends on the basis of the calculated correlation. Further, the job assignment apparatus 2 assigns the execution request job to one of the execution servers S connected to the job assignment apparatus 2 so as to exclude simultaneous execution of the execution request job and a job that depends on the same computer resource as the identified computer resource. According to the above-described configuration, the job assignment apparatus 2 calculates the execution times of the processing that depends on the computer resource and the execution request job which operate sequentially when the execution request job starts, so that the job assignment apparatus 2 may calculate a correlation between the two execution times in the same operation environment. Therefore, if the execution time used for the processing that depends on the computer resource fluctuates in accordance with fluctuation of the execution time used for processing a predetermined amount of data in the execution request job, the job assignment apparatus 2 may calculates a correlation indicating that the correlation between the two execution times is strong. As a result, the job assignment apparatus 2 may easily determine whether or not the execution request job depends on the computer resource on the basis of the calculated correlation.

On the basis of the identification result, the job assignment unit 2 assigns the execution request job to an execution server S so as to exclude simultaneous execution of the execution request job and a job that depends on the same computer resource as that on which the execution request job depends. Based on this, the job assignment unit 2 may properly perform an exclusion control between the jobs that depend on the same computer resource. Further, the job assignment unit 2 may avoid execution delay of the execution request job due to conflict to use the same computer resource.

According to the second embodiment, the correlation calculation unit 21c uses the execution times used for each processing that depends on a computer resource different from each other as the execution time used for the processing that depends on the computer resource in the control program p. Based on this, the correlation calculation unit 21c calculates correlations using the relations between the execution request job and a plurality of computer resources, so that the correlation calculation unit 21c may correctly identify which job depends on which computer resource.

According to the second embodiment, the correlation calculation unit 21c calculates the correlations by using execution times related to the control program p and the execution request job for a predetermined number of times after the execution request job has operated for the predetermined number of times. Based on this, the correlation calculation unit 21c may calculate the correlations on the basis of the execution times in accordance with a predetermined number of times of operations of the execution request job, so that, as the predetermined number of times increases, it is possible to calculate highly reliable correlations.

According to the second embodiment, the correlation calculation unit 21c uses the CPU, the I/O, and the memory as the computer resource. Based on this, the correlation calculation unit 21c may comprehensively determine which computer resource the execution request job depends on from the hardware resources in the execution server S that executes the execution request job.

According to the second embodiment, the server selection priority determination unit 22a determines a selection priority of the execution servers S to execute the execution request job on the basis of the multiplicity of the jobs executed by the execution servers S. The exclusion control target job confirmation unit 22b searches for an execution server S in which no job is executed which depends on the same computer resource as the computer resource on which the execution request job depends among the execution servers S selected in accordance with the determined selection priority. When an execution server S in which no job is executed which depends on substantially the same computer resource as the computer resource on which the execution request job depends is found, the job input unit 22c inputs the execution request job in queues of all the execution servers S from the execution server S having the highest selection priority to the execution server S having the selection priority of the found server. The job deletion unit 22e deletes the execution request job from the execution servers S other than the execution server S in which the execution request job becomes enable to be executed first among the execution servers S in which the execution request job is inputted by the job input unit 22c. Based on this, even if a job which depends on the same computer resource as that on which the execution request job depends is executed for a long time in an execution server S having a small multiplicity and a high selection priority, when the job is completed first in an execution server S having a large multiplicity and a low selection priority, the execution request job may be reliably executed in the execution server S in which the job is completed first.

According to the second embodiment, the control program p that operates at the start of the execution request job is a program that starts the execution request job. Based on this, the control program p is a program that starts the execution request job and the control program p is an essential program to execute the execution request job, so that it is possible to execute the execution request job at almost the same timing as that of the control program p without decreasing usage efficiency of the execution server S as a whole. As a result, the execution request job may correctly obtain the correlation between the execution request job and the control program p.

Here, another example of the exclusion control management table 35 will be described with reference to FIG. 11. FIG. 11 is a diagram depicting another example of the data structure of the exclusion control management table 35. The same reference symbols are given to the same constituent elements as those in the exclusion control management table 35 depicted in FIG. 8, and redundant description thereof will be omitted.

The difference between the exclusion control management table 35 depicted in FIG. 11 and the exclusion control management table 35 depicted in FIG. 8 is, as shown by the reference symbol r2, that exclusion character strings different from each other are stored for each dependence on the resource (computer resource) 35*b* to 35*d*. The exclusion character strings are character strings for identifying batch jobs which depend on substantially the same computer resource, and for example, the exclusion character strings are values generated by a random number generation function. Based on this, the batch jobs having the same exclusion character string may be identified to depend on the same computer resource, so that it is possible to prevent simultaneous execution of these batch jobs.

For example, jobs of the job names 35*a* "J001" and "J659" depend on the computer resource A, and these jobs shares the exclusion character string "#0293484883" identifying that the jobs depend on the computer resource A. If the job assignment unit 22 sets the same exclusion character string "#0293484883" in identification texts (for example, "resource texts") of the job names 35*a* "J001" and "J659", simultaneous execution of these batch jobs is prevented by conventional exclusion control technique. Therefore, the job assignment unit 22 may properly perform an exclusion control between the jobs that depend on the same computer resource by using the exclusion control management table 35.

In the above-described second embodiment, it is described that the job characteristic identification unit 21 identifies the computer resource on which the batch job depends at the timing when the batch job is requested to be started. However, it is not limited to this, and the job characteristic identification unit 21 may identify the computer resource on which each batch job depends, for example, at the timing of characteristic identification request which is issued regularly or not regularly and which identifies a characteristic of each batch job.

In the above-described second embodiment, it is described that the job assignment unit 22 operates at the timing when the job assignment unit 22 receives a start request of the execution request job outputted from the resource identification unit 21*d* of the job characteristic identification unit 21. However, it is not limited to this, and the job assignment unit 22 may operate independently without coordinating with the job characteristic identification unit 21. Specifically, for example, the job assignment unit 22 may operate at the timing when the batch job is requested to be started and operate separately from the job characteristic identification unit 21. In this case, for example, as described above, the job characteristic identification unit 21 may operate independently at the timing of characteristic identification request for identifying a characteristic of batch job, and operate in advance before the job assignment unit 22 operates.

In the above-described second embodiment, it is described that when information related to the execution request job for a predetermined number of execution times is stored in the execution time information accumulation table 33, the correlation calculation unit 21*c* calculates the correlation coefficient between the control program p and the execution request job. In this case, first, when the information for a predetermined number of execution times is stored, the correlation calculation unit 21*c* calculates the correlation coefficient by using the information. However, next time, when the information for a predetermined number of execution times is further stored, the correlation calculation unit 21*c* may calculates the correlation coefficient by using the information in addition to the previous information. In this way, the correlation calculation unit 21*c* calculates the correlation coefficient by using information, the amount of which is greater than that of the information for the predetermined number of execution times, so that it is possible to improve the reliability of the calculated correlation coefficient.

In the above-described second embodiment, it is described that the resource dependent processing execution time calculation unit 21*a* calculates the execution time used for the processing that depends on the computer resource in the control program p which operates at the start of the execution request job that is requested to be executed. However, it is not limited to this, and the resource dependent processing execution time calculation unit 21*a* may calculate the execution time of the processing in a predetermined program which operates immediately before the start of the execution request job that is requested to be executed and calculates the execution time of the processing that depends on the computer resource.

The job assignment apparatuses 1 and 2 can be realized by mounting the functions of the job characteristic identification unit 21, the job assignment unit 22, and the storage unit 30 described above on an information processing apparatus such as a known personal computer or workstation.

The constituent elements in each apparatus depicted in the figures are not necessarily configured physically as depicted in the figures. In other words, specific forms of distribution and integration of the apparatuses are not limited to those illustrated in the figures, and all or part of the apparatuses can be functionally or physically distributed or integrated in arbitrary units according to various loads and the state of use. For example, the resource dependent processing execution time calculation unit 21*a* and the job execution time calculation unit 21*b* may be integrated into one unit. On the other hand, the correlation calculation unit 21*c* may be divided into a CPU resource correlation calculation unit for calculating a correlation between the processing that depends on the CPU resource and the execution request job and an I/O resource correlation calculation unit for calculating a correlation between the processing that depends on the I/O resource and the execution request job. The storage unit 30 may be connected to the job assignment apparatus 2 via a network as an external apparatus of the job assignment apparatus 2. Also, the job characteristic identification unit 21 and the job assignment unit 22 may be respectively included in other apparatuses, and connected to the job assignment apparatus 2 via a network to cooperate with each other so that the function of the above-described job assignment apparatus 2 is realized.

Various processing described in the above embodiments may be achieved by causing a computer such as a personal computer or a workstation to execute a program prepared in advance. Therefore, hereinafter, an example of a computer that executes a job assignment program having the same function as that of the job assignment apparatus 2 depicted in FIG. 2 will be described with reference to FIG. 12.

Figure 12:
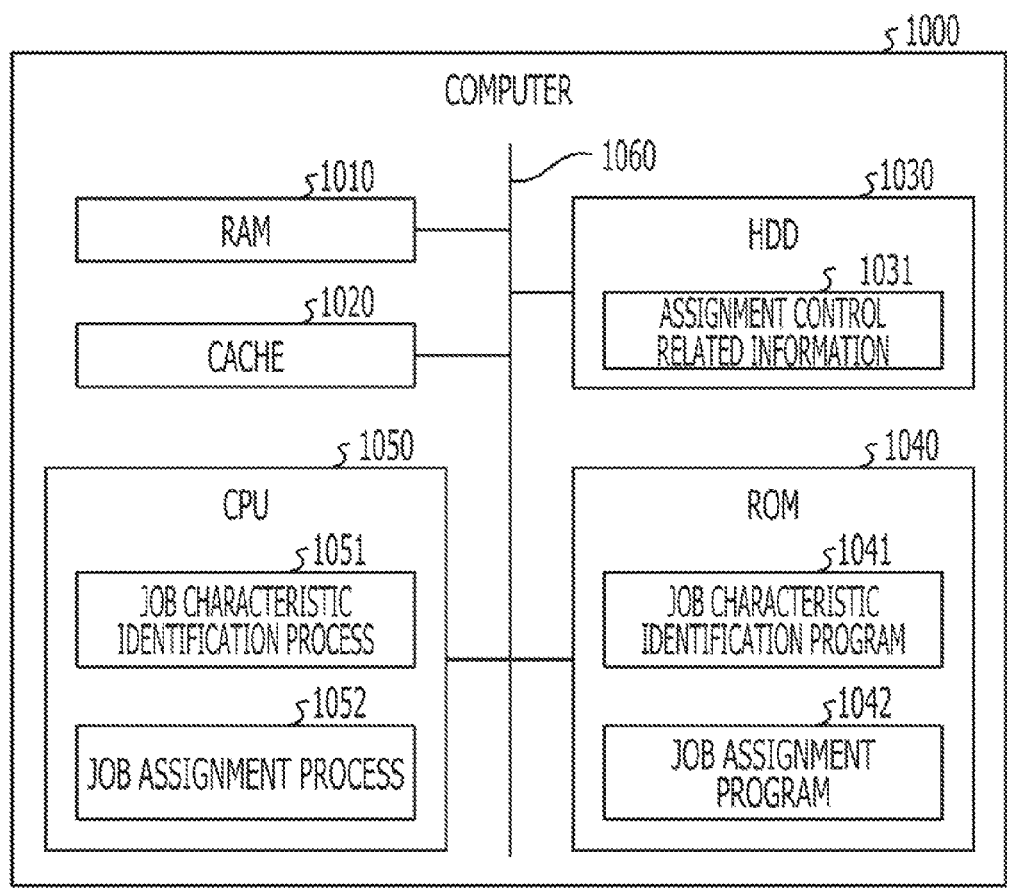
FIG. 12 is a diagram depicting a computer for executing a job assignment program.

FIG. 12 is a diagram depicting an apparatus, such as a computer, 1000 that executes the job assignment program. A computer 1000 includes a RAM (Random Access Memory) 1010, a cache 1020, an HDD 1030, a ROM (Read Only Memory) 1040, a CPU (Central Processing Unit) 1050, and a bus 1060. The RAM 1010, the cache 1020, the HDD 1030, the ROM 1040, and the CPU 1050 are connected to each other via the bus 1060.

In the ROM 1040, a job assignment program performing substantially the same function as that of the job assignment apparatus 2 depicting in FIG. 2 is stored in advance. Specifically, in the ROM 1040, a job characteristic identification program 1041 and a job assignment program 1042 are stored.

The CPU 1050 reads and executes the job characteristic identification program 1041 and the job assignment program 1042. Based on this, the job characteristic identification program 1041 becomes a job characteristic identification process 1051 and the job assignment program 1042 becomes a job assignment process 1052. The job characteristic identification process 1051 corresponds to the job characteristic identification unit 21 depicted in FIG. 2 and the job assignment process 1052 corresponds to the job assignment unit 22 depicted in FIG. 2.

In the HDD 1030, assignment control related information 1031 is stored. The assignment control related information 1031 corresponds to, for example, various data (the execution time history table 31, the execution time management table 32, the execution time information accumulation table 33, the correlation management table 34, the exclusion control management table 35, and jobs j1 to jm) stored in the storage unit 30 depicted in FIG. 2.

The above-described programs 1041 and 1042 need not necessarily be stored in the ROM 1040. For example, the programs 1041 and 1042 may be stored in a "portable physical medium" such as a flexible disk (FD), a CD-ROM, an MO disk, a DVD disk, a magneto-optical disk, and an IC card inserted into the computer 1000. Or, the programs 1041 and 1042 may be stored in a "fixed physical medium" such as a hard disk drive (HDD) provided inside or outside the computer 1000. Or, the programs 1041 and 1042 may be stored in "another computer (or server)" connected to the computer 1000 via a public line, the Internet, LAN, WAN, or the like. The computer 1000 may read the programs from the above-mentioned flexible disk or the like and execute the programs.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has (have) been described in detail, it should be understood that the various changes, substitutions, and alterations could be made hereto without departing from the spirit and scope of the invention.

What is claimed is:

1. A job assignment apparatus comprising:
   a memory; and
   a processor, coupled to the memory, configured to:
      calculate a first execution time used for processing a program that depends on a computer resource executed in response to a request for an execution request job and a second execution time used for processing a predetermined amount of data in the execution request job executed following the program;
      wherein the execution request job is a batch job; and
   the processor is configured to:
      calculate a correlation, by using execution times related to the program and the execution request job, for a predetermined number of times after the execution request job has operated for the predetermined number of times,
      calculate a correlation coefficient between the first and second execution times that depend on the computer resource and the batch job,
      classify the batch job from the calculated correlation coefficient on a basis of a strength of the correlation,
      identify the computer resource, on which the execution request job depends, on the basis of the classification; and
      assign the execution request job to one of a plurality of execution servers connected to the job assignment apparatus so as to exclude simultaneous execution of the execution request job and a job that depends on the same computer resource as the computer resource identified.

2. The job assignment apparatus according to claim 1, wherein the processor uses execution times used for each processing that depends on a computer resource different from each other as the execution time used for processing that depends on a computer resource in the program.

3. The job assignment apparatus according to claim 1, wherein the processor identifies each of a CPU (Central Processing Unit), an I/O (Input/Output), and a memory as the computer resource.

4. The job assignment apparatus according to claim 1, wherein the processor is further configured to:
   determine a selection priority of the execution servers selected to execute the execution request job on a basis of a multiplicity of jobs executed by the execution servers,
   search for an execution server in which no job is executed which depends on the same computer resource as the computer resource on which the execution request job depends among the execution servers selected in accordance with the selection priority determined by the selection priority determination unit,
   input, when an execution server in which no job is executed which depends on the same computer resource as the computer resource on which the execution request job depends is found, the execution request job in queues of all the execution servers from the execution server having the highest selection priority to the execution server having the selection priority of the found server, and
   delete the execution request job from execution servers other than the execution server in which the execution request job becomes enabled to be executed first among the execution servers in which the execution request job is input.

5. The job assignment apparatus according to claim 1, wherein the processor uses a control program that starts the execution request job as the program that operates at the start of the execution request job.

6. A computer-readable, non-transitory medium storing a job assignment program, the job assignment program causing a computer to execute the following processing:
   calculating a first execution time used for processing a program that depends on a computer resource executed in response to a request for an execution request job and a second execution time used for processing a predetermined amount of data in the execution request job executed following the program;

wherein the execution request job is a batch job; and
the processing further comprising:
  calculating, with a processor, a correlation, by using execution times related to the program and the execution request job, for a predetermined number of times after the execution request job has operated for the predetermined number of times;
  calculating a correlation coefficient between the first and second execution times that depend on the computer resource and the batch job; and
  classifying the batch job from the calculated correlation coefficient on a basis of a strength of the correlation;
  identifying the computer resource on which the execution request job depends on the basis of the classifying; and
  assigning the execution request job to one of a plurality of execution servers connected to the computer so as to exclude simultaneous execution of the execution request job and a job that depends on the same computer resource as the identified computer resource.

7. A job assignment method of a job assignment apparatus for assigning jobs to execution servers, the job assignment method comprising:
  calculating a first execution time used for processing a program that depends on a computer resource executed in response to a request for an execution request job and a second execution time used for processing a predetermined amount of data in the execution request job executed following the program,
  wherein the execution request job is a batch job;
  calculating, with a processor, a correlation, by using execution times related to the program and the execution request job, for a predetermined number of times after the execution request job has operated for the predetermined number of times;
  calculating a correlation coefficient between the first and second execution times that depend on the computer resource and the batch job;
  classifying the batch job from the calculated correlation coefficient on a basis of a strength of the correlation;
  identifying the computer resource on which the execution request job depends on the basis of the classifying; and
  assigning the execution request job to one of a plurality of execution servers connected to the job assignment apparatus so as to exclude simultaneous execution of the execution request job and a job that depends on the same computer resource as the identified computer.

8. A job assignment apparatus for assigning jobs to execution servers, the job assignment apparatus comprising:
  a processor to calculate a first execution time used for processing a program that depends on a computer resource executed in response to a request for an execution request job and a second execution time used for processing a predetermined amount of data in the execution request job executed following an operation of the program, wherein the execution request job is a batch job, and the processor is further configured to calculate a correlation, by using execution times related to the program and the execution request job, for a predetermined number of times after the execution request job has operated for the predetermined number of times, to calculate a correlation coefficient between the first and second execution times that depend on the computer resource and the batch job, to classify the batch job from the calculated correlation coefficient on a basis of a strength of the correlation, to identify a computer resource on which the execution request job depends based on the classification, and to assign the execution request job to one of a plurality of execution servers connected to the job assignment apparatus so as to exclude simultaneous execution of the execution request job and a job that depends on the same computer resource as the identified computer resource.

* * * * *